(12) United States Patent
Obuchi et al.

(10) Patent No.: US 7,272,396 B2
(45) Date of Patent: Sep. 18, 2007

(54) WIRELESS BASE STATION AND MOBILE STATION

(75) Inventors: Kazuhisa Obuchi, Yokohama (JP); Tetsuya Yano, Yokosuka (JP); Shunji Miyazaki, Yokosuka (JP)

(73) Assignee: Fujitsu Limited, Kawasaki (JP)

( * ) Notice: Subject to any disclaimer, the term of this patent is extended or adjusted under 35 U.S.C. 154(b) by 70 days.

(21) Appl. No.: 11/176,255

(22) Filed: Jul. 8, 2005

(65) Prior Publication Data

US 2006/0135163 A1 Jun. 22, 2006

(30) Foreign Application Priority Data

Dec. 17, 2004 (JP) .............................. 2004-366439

(51) Int. Cl.
*H04A 7/20* (2006.01)
*H04A 7/00* (2006.01)
(52) U.S. Cl. ...................... 455/436; 455/437; 455/438; 455/442; 370/331
(58) Field of Classification Search ........ 455/336–451, 455/452.1, 452.2, 454–455, 509–517, 524–525, 455/63.1, 67.13, 550.1, 560–561, 567, 450, 455/556.2; 370/328–333, 335–338
See application file for complete search history.

(56) References Cited

U.S. PATENT DOCUMENTS

| | | | | |
|---|---|---|---|---|
| 5,530,693 A * | 6/1996 | Averbuch et al. | ........... | 370/331 |
| 6,157,828 A * | 12/2000 | Krishnamurthi | ......... | 455/414.1 |
| 6,614,770 B1 * | 9/2003 | Kayama et al. | ............. | 370/331 |
| 6,704,571 B1 * | 3/2004 | Moon | .......................... | 455/436 |
| 6,795,428 B1 * | 9/2004 | Diachina et al. | ............ | 370/349 |
| 6,985,731 B1 * | 1/2006 | Johnson et al. | ............. | 455/436 |
| 7,031,712 B2 * | 4/2006 | Takano et al. | .............. | 455/442 |
| 2002/0032030 A1 | 3/2002 | Berglund et al. | | |
| 2003/0083070 A1 * | 5/2003 | Ishikawa et al. | ........... | 455/436 |
| 2003/0086395 A1 * | 5/2003 | Shanbhag | ................... | 370/331 |
| 2003/0185159 A1 | 10/2003 | Seo et al. | ................... | 370/278 |

FOREIGN PATENT DOCUMENTS

| | | |
|---|---|---|
| EP | 05254464.0 | 7/2006 |
| JP | 2000-217139 | 8/2000 |

(Continued)

OTHER PUBLICATIONS

3GPP TS 25.212 v6.2.0 (Jun. 2004); 3$^{rd}$ Generation Partnership Project; Technical Specification Group Radio Access Network; Multiplexing and Channel Coding (FDD) (Release 6).

(Continued)

*Primary Examiner*—Meless Zewdu
(74) *Attorney, Agent, or Firm*—Bingham McCutchen LLP

(57) ABSTRACT

The occurrence of problematic data portions during handover is prevented by a wireless base station in a wireless communication system wherein mobile stations to be transmitted to are selected successively from a plurality of transmission destination candidate mobile stations and data transport to the selected mobile station is performed via a shared channel, the wireless base station comprising a detection unit which detects mobile stations undergoing handover; and a control unit which provides control such that a mobile station detected by the detection unit becomes less likely to be selected as described above as compared to other mobile stations.

13 Claims, 10 Drawing Sheets

FOREIGN PATENT DOCUMENTS

| | | |
|---|---|---|
| WO | WO 01/24567 A1 | 4/2001 |
| WO | WO 02/067606 A2 | 8/2002 |
| WO | WO 02/067606 A3 | 8/2002 |
| WO | WO 03/059002 A1 | 7/2003 |

OTHER PUBLICATIONS

3GPP TS 25.214 v6.2.0 (Jun. 2004); 3$^{rd}$ Generation Partnership Project; Technical Specification Group Radio Access Network; Physical Layer Procedures (FDD) (Release 6).

* cited by examiner

WIRELESS BASE STATION AND MOBILE STATION

CROSS REFERENCE TO RELATED APPLICATION

This application is related to and claims priority to Japanese Application No. 2004-366439 filed Dec. 17, 2004 in the Japanese Patent Office, the contents of which are incorporated by reference herein.

BACKGROUND OF THE INVENTION

1. Field of the Invention

The present invention relates to wireless base stations and mobile stations, preferably wireless base stations and mobile station used in a mobile wireless communication system using a W-CDMA (UMTS) communication protocol.

2. Description of the Related Art

Currently, HSDPA (High Speed Downlink Packet Access) is being implemented as one data transport scheme using wireless communication (see Non-Patent Document 1). HSDPA is a scheme which allows high-speed downlink packet transport, with a maximum transfer rate of approximately 14 Mbps being considered possible.

HSDPA is characterized in that it employs an adaptive modulation and coding (AMC) scheme, switching for example between the QPSK modulation scheme and 16-QAM scheme adaptively according to the wireless environment between the base station and mobile station.

Furthermore, HSDPA employs an H-ARQ (Hybrid Automatic Repeat ReQuest) scheme. Under H-ARQ, when a mobile station detects an error in data received from a base station, the mobile station makes a retransmission request to the base station in question. The base station performs retransmission of data upon receiving this retransmission request, and the mobile station performs error correction decoding using both the already received data and the retransmitted received data. In this way, H-ARQ reduces the number of retransmissions by effectively utilizing already received data, even if it contains errors.

The main wireless channels used in HSDPA include HS-SCCH (High Speed-Shared Control Channel), HS-PDSCH (High Speed-Physical Downlink Shared Channel) and HS-DPCCH (High Speed-Dedicated Physical Control Channel).

HS-SCCH and HS-PDSCH are both downlink (i.e. in the direction from the base station to the mobile station) shared channels. HS-SCCH is a control channel for transmitting various parameters relating to the data transmitted on HS-PDSCH. The various parameters include, for example, modulation scheme information indicating which modulation scheme is to be used, the allocated spreading code number (code number), information on the rate matching pattern applied before transmission, etc.

Furthermore, HS-DPCCH is an uplink (in the direction from the mobile station to the base station) dedicated control channel, which is used by the mobile station for instance for sending the result of reception for data received from the base station via HS-PDSCH in the form of an ACK signal or NACK signal, depending respectively on whether the reception was or was not successful. If the mobile station fails to receive data (if the received data has a CRC error, etc.), a NACK signal will be transmitted from the mobile station as a retransmission request and the base station will accordingly perform retransmission control. Furthermore, if the wireless base station cannot receive either an ACK or a NACK signal (in the case of DTX), the fact that the mobile station has sent neither an ACK nor a NACK signal can also be a retransmission request for purposes of retransmission control.

In addition, HS-DPCCH is used by a mobile station to transmit, to a base station, reception quality information, determined by the mobile station for signals received from a base station, in the form of CQI (Channel Quality Indicator) information (e.g., SIR). The base station modifies the downlink transmission format based on the received CQI information. In other words, if the CQI information indicates that the downlink wireless environment is good, the base station would switch the transmission format to a modulation scheme that allows higher speed data transmission, while if the CQI information indicates that the downlink wireless environment is not good, the base station would switch the transmission format to a modulation scheme which transmits data at a lower rate (i.e., the base station performs adaptive modulation).

Channel Structure

Next, the channel configuration of HSDPA will be described.

FIG. 1 is a drawing which illustrates the channel configuration of HSDPA. Since W-CDMA employs a code division multiplexing scheme, the individual channels are separated by code.

First, the channels which have not been explained will be briefly described.

CPICH (Common Pilot Channel) is a downlink common channel which is transmitted to all mobile stations in a wireless zone (cell).

CPICH is a channel for transmitting a so-called pilot signal, and is used by the mobile station for channel estimation, cell search, and as timing reference for other downlink physical channels in the same cell.

Next, the timing relationship of the channels will be described using FIG. 1.

As shown in the drawing, in each channel, one frame (10 ms) consists of 3 ×5=15 slots (each slot comprises a 2560 chip length). As described above, CPICH is used as a reference for other channels, so the head of the P-CCPCH and HS-SCCH frames is aligned with the head of the CPICH frame. Here, the head of the HS-PDSCH frame is delayed by 2 slots relative to HS-SCCH, etc., which is to make it possible for the mobile station to perform demodulation of HS-PDSCH with the modulation scheme corresponding to the received modulation type after receiving modulation type information via HS-SCCH. Furthermore, HS-SCCH and HS-PDSCH comprise sub-frames of 3 slots.

HS-DPCCH is an uplink channel, which contains a slot (1 slot long) used by the mobile station for transmitting an ACK/NACK signal, which is a response for acknowledgement of reception, to the base station approximately 7.5 slots after the HS-PDSCH reception.

Furthermore, HS-PDCCH is used for periodically transmitting CQI information as feedback for adaptive modulation control to the base station. Here, the transmitted CQI information is for example calculated based on the reception environment (e.g. the SIR determination result for CPICH) as determined in the period from 4 slots until 1 slot before the CQI transmission.

Matters relating to HSDPA as discussed above are disclosed for instance in 3G TS 25.212 (3rd Generation Partnership Project: Technical Specification; Group Radio Access Network; Multiplexing and channel coding (FDD)) V6.2.0 (June 2004).

SUMMARY OF THE INVENTION

According to the background art described above, the wireless base station transmits CPICH on a shared channel, and the mobile station transmits (part A2) the CPICH reception quality (the CPICH reception SIR) determined in a determination segment (part A1) as a parameter (CQI) for adaptive modulation control. The wireless base station then transmits (part A3) a transmission alert for data to be transmitted based on that parameter, and subsequently transmits (part A4) the adaptively modulated data, and the mobile station transmits (part A5) the reception result (ACK signal or NACK signal) for this data.

This series of procedures starts with transmission of a signal which affects adaptive modulation control, followed by transmission of data using adaptive modulation control and then transmission of a reception result for the transmitted data, thereby ensuring reliable execution of data transmission based on adaptive modulation control.

However, there is the problem that an extremely long time is needed from the transmission of A1 until A3 (A4) or A5 is transmitted (one data transmission cycle).

This problem will be explained here using FIG. 2.

FIG. 2 is a drawing serving to describe the operation during handover, where this problem becomes prominent.

It is assumed that the mobile station moves from wireless zone 1 (cell 1) toward wireless zone 2 (cell 2), and performs processing to effect changeover switch from wireless zone 1 to 2 as it moves.

In the drawing, assuming that handover processing was performed right between subframe 6 and subframe 7, it can be seen that one data transmission cycle will not be completed in the data area framed with a dotted line in the drawing, causing data transmission problems.

The reason for this is that the transmission of the ACK signal indicating the reception result for the third through fifth HS-SCCH sub-frames transmitted in cell 1 (and the corresponding HS-PDSCH sub-frames) is transmitted to cells 2, so reception cannot be acknowledged in cell 1.

Furthermore, HS-SCCH sub-frames 7 through 10 transmitted in cell 2 (and the corresponding HS-PDSCH sub-frames) will be associated with adaptive modulation control based on the CQI for CPICH transmitted in cell 1, rather than adaptive modulation control according to the reception environment.

Moreover, with regard to the sixth HS-SCCH sub-frame (and the corresponding HS-PDSCH sub-frame), the mobile station switches the transmission source cell for reception of HS-PDSCH from 1 to 2 midway in the corresponding HS-PDSCH sub-frame, leading to an error and ultimately rendering useless the transmission alert made by the sixth sub-frame.

Focusing on a single data transmission cycle, if there is problematic data within that cycle, it could cause the same sort of problems with regard to the corresponding HS-SCCH, HS-PDSCH, CQI, and ACK signal as well.

As described above, since a single data transmission cycle is long, it ends up containing problematic data portions over a wide area before and after handover.

Furthermore, the problematic data portion may have a high probability of being retransmitted or cause interference with other wireless signals.

Therefore, an objective of the present invention is to prevent the occurrence of problematic data portions during handover.

Providing beneficial effects, not limited to the above objective, derived from the various components of the best mode for practicing the invention as described below and which cannot be obtained from the prior art, can also be positioned as an objective of the present invention.

(1) The present invention employs a wireless base station in a wireless communication system wherein mobile stations to be transmitted to are selected successively from a plurality of transmission destination candidate mobile stations and data transport to the selected mobile station is performed via a shared channel, said wireless base station being characterized in that it comprises: a detection unit which detects mobile stations undergoing handover; and a control unit which provides control such that a mobile station detected by said detection unit becomes less likely to be selected as described above as compared to other mobile stations.

(2) The present invention employs a wireless base station as set forth in (1), characterized in that said control is performed in a specific period before or after changeover of the channel which alerts that data is to be transmitted via a shared channel due to handover processing.

(3) The present invention employs a wireless base station as set forth in (1), characterized in that said control relates to an alert channel which is transmitted before changeover of the channel which alerts that data is to be transmitted via a shared channel due to handover processing, where the transmission timing of the reception result for the shared channel transmitted according to said alert channel being after said channel changeover.

(4) The present invention employs a wireless base station as set forth in (1), characterized in that said control relates to an alert channel which is transmitted after changeover of the channel which alerts that data is to be transmitted via a shared channel due to handover processing, where the parameters to be used for said alert are transmitted before said channel changeover.

(5) The present invention employs a wireless base station as set forth in (1), characterized in that said control relates to an alert channel which is transmitted before changeover of the channel which alerts that data is to be transmitted via a shared channel due to handover processing, where the shared channel transmitted according to said alert verges upon the timing of said changeover.

(6) The present invention employs a mobile station which transmits reception quality information for signals received from a wireless base station and receives data via a downlink channel from said wireless base station based on said reception quality information, said mobile station being characterized in that it comprises: a detection unit which detects that handover processing is being performed; and a control unit which, upon said detection, provides control such reception quality information is not transmitted if its transmission timing is before changeover of said downlink channel due to said handover processing, but the transmission timing of the data transmitted via said downlink channel from said wireless base station based on said reception quality information is after said channel changeover.

(7) The present invention employs a mobile station which transmits reception quality information for signals received from a wireless base station, receives transmission alerts and the data which said transmission alerts concern via a downlink channel from said wireless base station based on said reception quality information, and transmits the reception result for said data, said mobile station being characterized in that it comprises: a detection unit which detects that handover processing is being performed; and a control unit which, upon said detection, provides control such a reception result is not transmitted if its transmission timing is after changeover of said downlink channel due to said handover processing, but the transmission timing of the reception quality information used for transmitting data relating to the reception result indicated by said reception result is before said channel changeover.

According to the present invention, occurrence of problematic data portions during handover is prevented.

DETAILED DESCRIPTION OF THE PREFERRED EMBODIMENTS

Figure 1:
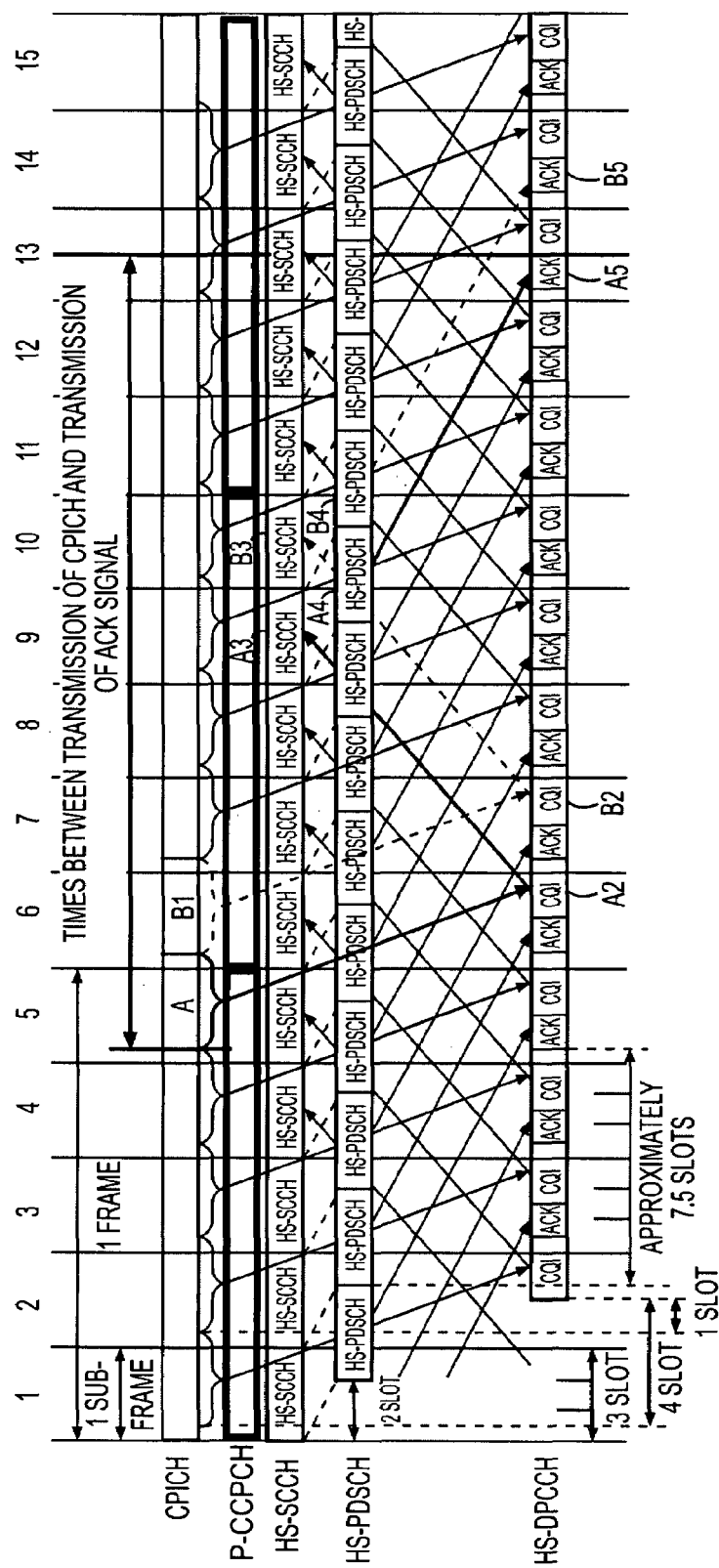
FIG. 1 is a diagram which illustrates the channel configuration of HSDPA.

Embodiments of the present invention are described below by referring to the drawings.

(a) Description of First Embodiment

In this embodiment, mobile stations undergoing handover are distinguished from other mobile stations, and transmission of data via a shared channel to mobile stations undergoing handover is avoided as much as possible.

In other words, in a wireless communication system wherein mobile stations to be transmitted to are selected in order from a plurality of transmission destination candidate mobile stations and data transport to the selected mobile station is performed via a shared channel (such as HS-PDSCH), a detection unit which detects a mobile station undergoing handover is provided, and control is provided such that a mobile station detected by said detection unit becomes less likely to be selected compared to other mobile stations (for example, the mobile station is removed form the transmission destination candidates when compiling the transmission schedule).

This provides control oriented toward not transmitting data via a shared channel to mobile stations where the data is likely to cause problems because handover is being performed.

Furthermore, since this makes it possible to transmit data instead to other mobile stations via the shared channel, the shared channel utilization rate is improved.

Moreover, in cases where retransmission control is performed, the incidence of retransmission control is reduced.

Below, this arrangement is described specifically using the previously described HSDPA as an example.

This invention is of course not limited to HSDPA and can be applied to other wireless communication systems which perform handover processing as well. In such cases, as with HSDPA, it is most preferable to apply the invention to systems which perform adaptive modulation control (as well as retransmission control, etc.).

Configuration of mobile communication system

Figure 3:
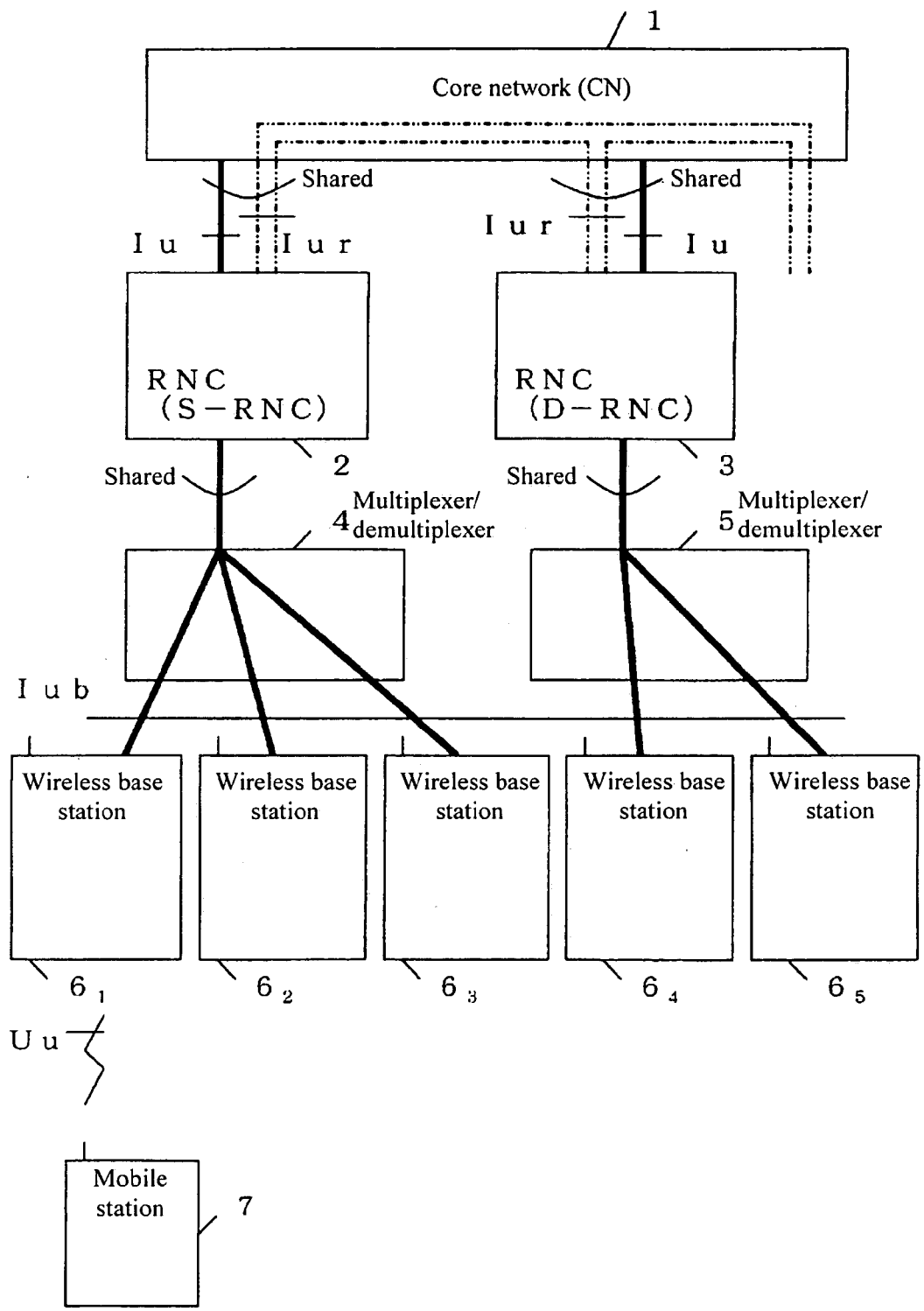
FIG. 3 is a diagram which illustrates a mobile communication system according to the present invention.

FIG. 3 shows an example configuration of a wireless communication system of the present invention. While various types of mobile communication systems are possible, here, the system is assumed to be an HSDPA-compatible mobile communication system based on W-CDMA (UMTS), as described under background art.

In the drawing, 1 is a core network, 2 and 3 are wireless base station controllers (RNC: Radio Network Controller), 4 and 5 are multiplexer/demultiplexers, $6_1$ through $6_5$ are wireless base stations (BS: Base Station) and 7 is a mobile station (UE: User Equipment).

Core network 1 is a network used for routing in the wireless communication system. The core network can comprise for instance an ATM switched network, packet switched network, router network, etc.

Core network 1 is positioned as higher level devices of wireless base stations $6_1$ through $6_5$ and is also connected to other public networks (PSTN), etc., enabling the mobile station 7 to communicate with stationary telephones and the like as well.

The wireless base station controllers 2 and 3, like the constituent devices of the core network, are positioned as higher-level devices of the wireless base stations $6_1$ through $6_5$, and are provided with a function of controlling these wireless base stations $6_1$ through $6_5$ (management of wireless resources used, etc.). They are furthermore provided with the function of performing control relating to handover processing, whereby communication with a mobile station 7 is switched over from communication with a handover source wireless base station to communication with a handover destination wireless base station (the function possessed by the handover processing function unit 13 described below).

Here, the concept of serving RNC (S-RNC) and drift RNC (D-RNC) will be explained.

The wireless base station controller which initially manages the processing of outgoing and incoming communications to and from the mobile station 7 is called the serving RNC (RNC 2 in FIG. 1).

If the mobile station 7 subsequently moves toward the right while continuing communication, it will move from the wireless area (cell) formed by wireless base station $6_3$, which is subordinate to serving RNC 2, to the wireless area (cell) formed by wireless base station $6_4$, which is subordinate to RNC 3.

At that time, since there is a need to perform changeover of the wireless base station 6 handling the wireless communication, so-called handover processing (hard handover processing) is executed.

Namely, mobile station 7 switches from transmitting data to wireless base station $6_3$ to transmitting data to wireless base station $6_4$. Furthermore, the reception state wherein data was being received from wireless base station $6_3$ is switched to a reception state wherein data is received from wireless base station $6_4$ (the transmission source for reception of data is changed over).

The wireless base station side likewise switches the transmission state wherein data was being transmitted from wireless base station $6_3$ to mobile station 7 to a transmission state wherein data is transmitted from wireless base station $6_4$ to mobile station 7, and switches the wireless base station receiving data from the mobile station 7 from $6_3$ to wireless base station $6_4$.

At the same time, the RNC serving as the gateway for exchanging data involving mobile station 7 with the core network side is assumed to be a single RNC (serving RNC).

Therefore, RNC 3, which manages the handover destination wireless base station $6_4$, forwards signals received from the mobile station 7 to serving RNC 2 (the signals may be forwarded via the core network 1, or if a direct connection is provided between RNCs 2 and 3, the signal may be forwarded via this direct connection, without going through the core network 1).

Prior to the handover, RNC 2, which functions as the serving RNC for mobile station 7, passes on data received from mobile station 7 via a subordinate wireless base station to the core network 1, and after the handover, RNC 2 passes on, to the core network 1, data received from mobile station 7 and forwarded from RNC 3.

RNC 3 is referred to as the drift RNC in relation to the serving RNC.

The same of course holds for signals transmitted downstream (from the core network 1 side to the mobile station 7). First, the signal is transmitted from the core network 1 to the serving RNC 2; before the handover, the serving RNC 2 transmits data to mobile station 7 via a subordinate wireless base station, while after the handover, serving RNC 2 forwards data to the drift RNC 3 and transmits data to the mobile station 7 via a wireless base station 6 subordinate to the drift RNC 3.

RNCs 2 and 3 can be omitted by assigning the functions of these RNCs to the wireless base stations 6 or core network 1. For example, the core network 1 could be provided with a handover processing function and the wireless base stations 6 could be given a wireless channel allocation control function and the like.

While the example described above involved handover between wireless base stations subordinate to different RNCs, handover is executed also between wireless base stations subordinate to the same RNC (e.g., between $6_1$ through $6_3$).

In this case, if the RNC is a serving RNC, data from the mobile station 7 received by a subordinate wireless base station can be transmitted to the core network 1 without forwarding to another RNC, and conversely, data received from the core network 1 can be transmitted to the mobile station 7 via a subordinate wireless base station without forwarding to another RNC.

Furthermore, even with a single wireless base station, in cases where a plurality of wireless areas (sectors (cells)) is formed for instance by using a plurality of antennas, handover can be performed between sectors (cells).

Now then, multiplexers/demultiplexers 4 and 5 are provided between the RNC and wireless base stations and perform control to demultiplex signals addressed to each wireless base station received from RNC 2 and 3 and output them to the various wireless base stations, as well as to multiplex signal from the wireless base stations and pass them on to the corresponding RNC.

Of course, these multiplexers/demultiplexers can be omitted if the wireless base station controller is connected directly to a plurality of wireless base stations.

Wireless base stations $6_1$ through $6_3$ perform wireless communication with mobile station 7 with their wireless resources being managed by RNC 2, and wireless base stations $6_4$ and $6_5$ perform wireless communication with mobile stations 7 with their wireless resources being managed by RNC 3.

When the mobile station 7 is within the wireless area (cell) of a wireless base station 6, it establishes a wireless link to the wireless base station 6 and is able to performs communication with other communication devices via the core network 1, and if the mobile station 7 moves, it can continue the communication with the other device by switching the wireless base station being communicated with by means of handover.

The above was an overview of the operation of the mobile communication system of the first embodiment illustrated in FIG. 3. The configuration and operation of each node will be described in detail below.

Wireless base station controller 2 (3)

Figure 4:
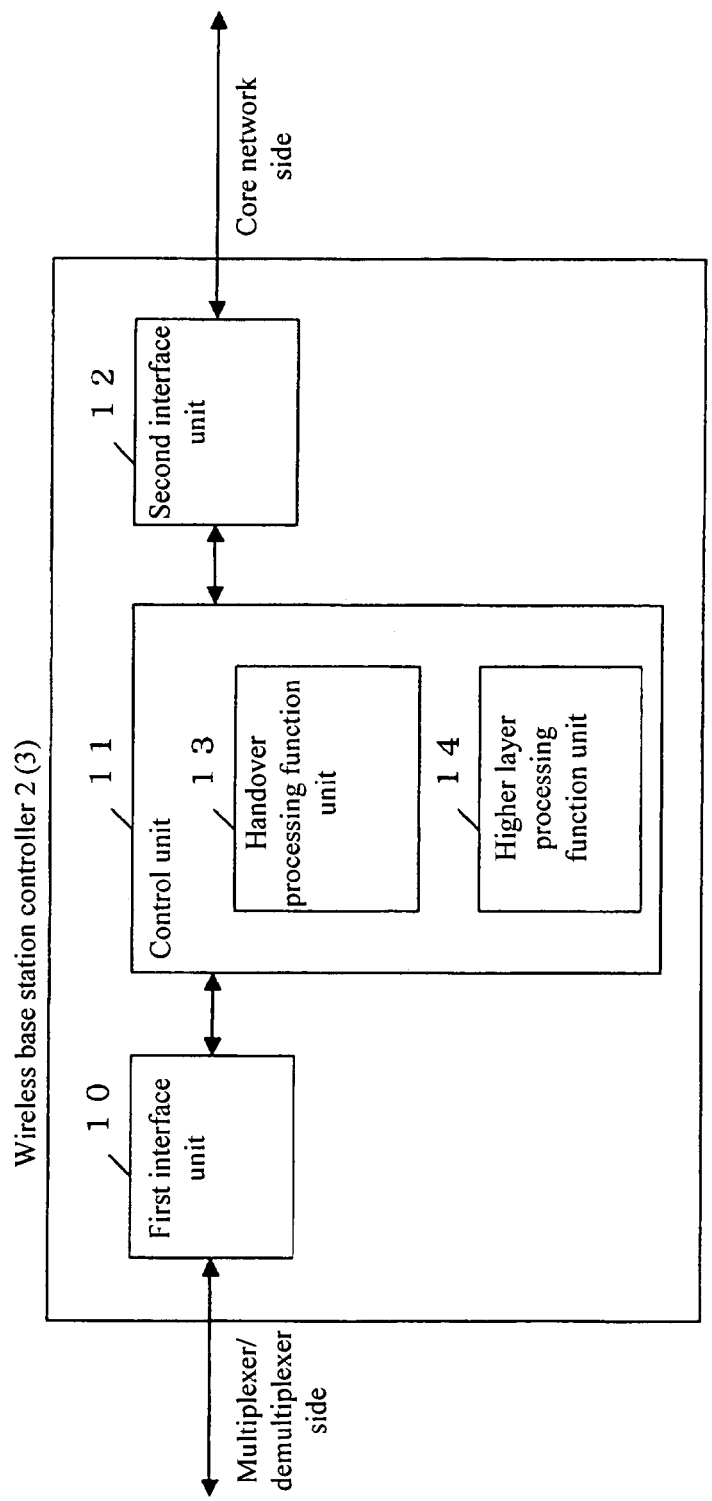
FIG. 4 is a diagram which illustrates a wireless base station controller according to the present invention.

FIG. 4 is a diagram illustrating a wireless base station controller (RNC: Radio Network Controller).

In the diagram, 10 represents a first interface unit for communication with a multiplexer/demultiplexer, 11 represents a control unit which controls the operation of the various units, and 12 represents a second interface unit for communication with the core network.

Preferably, an interface unit which performs transport according to the ATM scheme can be adopted for the first and second interface units. Of course, transmission according to other schemes can be carried out as well.

The control unit 11 controls the operations of the various units and comprises a handover processing function unit 13 which performs the processing relating to the above-described handover (forwarding, wireless channel allocation, etc.), and a higher layer processing function unit 14 for a layer such as the RLC (Radio Link Control) layer defined in the 3 GPP mobile communication system.

Next, the operation involved in transmitting signals from the core network 1 to the multiplexer/demultiplexer 4 (5) will be described.

The controller 11 segments data (e.g. variable length packet data), obtained by performing terminal processing in the second interface unit 12 on data received from the core network 1, into specific lengths, and generates, for example, a plurality of RLC PDUs (Packed Data Units).

In order to attach a serial number to each PDU, the control unit 11 writes the serial number into the sequence number field of each RLC PDU. These sequence numbers are used by the mobile station 7 to discover missing PDU sequence numbers, and if a missing sequence number occurs, in order to perform retransmission control in the RLC layer, the PDU sequence number which could not be correctly received is transmitted from the mobile station, and upon receiving this sequence number, the control unit 11 (higher layer processing function unit 14) retransmits the transmitted RLC PDU to the mobile station 7 (a copy of the transmitted RLC PDUs is stored in memory or the like).

Having generated the RLC PDU, the control unit 11 gathers multiple RLC PDUs, generates a signal with a format according to HS-PDSCH FP (frame protocol), and provides it to the first interface unit 10, from where it is subjected to, e.g., ATM cellification, and then transmitted to the multiplexer/demultiplexer 4 (5).

Wireless base stations $6_1$ to $6_5$

Figure 5:
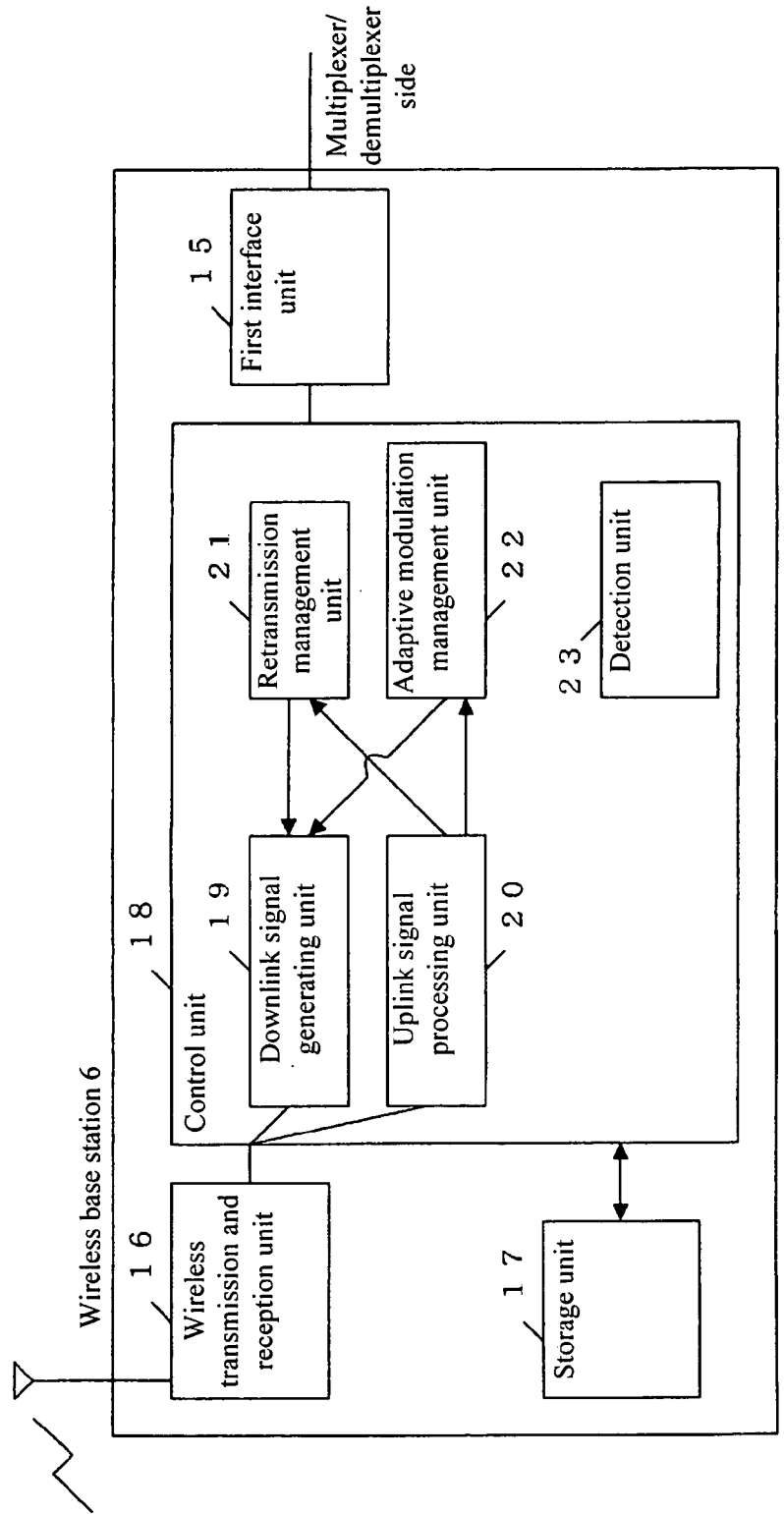
FIG. 5 is a diagram which illustrates a wireless base station (example 1 according to the present invention).

FIG. 5 is a diagram illustrating a wireless base station 6 (BS: Base Station).

In the drawing, 15 represents a first interface unit which performs terminal processing of signals demultiplexed and transmitted from the multiplexer/demultiplexer 4 (5) as signals addressed to the device in question, while 16 represents a wireless transmission and reception unit for transmitting wireless signals to and receiving wireless signals from the mobile station 7.

17 represents a storage unit used for storing transmitted data for retransmission in order to perform retransmission control using the above-described H-ARQ which is executed between the wireless base station and mobile station 7, as well as for storing queued data to be transmitted on the HS-PDSCH shared channel.

18 represents a control unit which performs control of the various units and comprises a downlink signal generating unit 19, an uplink signal processing unit 20, a retransmission management unit 21, an adaptive modulation management unit 22 and a detection unit 23.

Here, the downlink signal generating unit 19 generates data to be transmitted in the form of downlink signals (the data of CPICH, HS-SCCH, HS-PDSCH, etc.), while the uplink signal processing unit 20 extracts CQI information, ACK signals, NACK signals, and the like from the uplink signal (HS-DPCCH) etc.

Furthermore, the retransmission management unit 21 manages H-ARQ related retransmission control, and the detection unit 23 detects mobile stations undergoing handover. For example, detection of mobile stations undergoing handover is performed by receiving notification from the wireless base station controller 2 (3) regarding the mobile station which is to undergo handover and the timing thereof (for example, timing A of FIG. 2). Other detection techniques can of course be used as well.

Next, the operation of processing the data received from the multiplexer/demultiplexer 4 (5) will be described.

First, the HS-PDSCH frames received via the first interface unit 15 are input into the control unit 18.

Control unit 18 stores the MAC-d PDUs addressed to some mobile station, contained in the received HS-PDSCH frame, in the storage unit 17.

Then, upon detecting that transmission of data addressed to that mobile station via the shared channel HS-PDSCH is possible, a plurality of MAC-d PDUs addressed to that mobile station are extracted sequentially from the storage unit 17, an a MAC-hs PDU containing a plurality of MAC-d PDUs is generated. The number of MAC-d PDUs to be extracted is selected so that they fit into the transport block size determined based on CQI information and the like.

A MAC-hs PDU forms one transport block and serves as the source of data transmitted via HS-PDSCH to the mobile station 7.

A MAC-hs PDU contains a TSN (Transmission Sequence Number), which is attached to each MAC-hs PDU, so even if the HS-PDSCH transmission to the mobile station 7 is performed over several processes, the transport block can be rearranged according to this sequence number.

The MAC-hs PDU generated in the control unit 18 is stored in the storage unit 17 for purposes of H-ARQ based retransmission control and is input into the downlink signal generating unit 19, subjected to processing such as error correction coding and error detection coding, formed into an HS-DPSCH sub-frame, and is given to the wireless transmission and reception unit 16 together with other signals, from where it is transmitted to the mobile station 7 via HS-PDSCH.

However, before transmitting HS-PDSCH as described above, a transmission alert is given to the mobile station 7 via HS-SCCH.

In other words, before transmission of HS-PDSCH, control unit 18 provides the data to be transmitted via HS-SCCH to the downlink signal generating unit 19, and the downlink signal generating unit 19 generates an HS-SCCH sub-frame based on the data provided and provides it to the wireless transmission and reception unit 16.

Receiving the transmission alert on HS-SCCH, the mobile station 7 which has received HS-PDSCH transmits the HS-PDSCH reception result (ACK signal or NACK signal) via HS-DPCCH.

The uplink signal processing unit 20 of the wireless base station 6 performs reception processing of the uplink signal (HS-DPCCH, etc.) from the mobile station 7 and notifies the retransmission management unit 21 if the reception result is detected to be a NACK signal.

Accordingly, the retransmission management unit 21 reads the MAC-hs PDU for which transmission failed from the storage unit 17, again provides it to the downlink signal generating unit 19, and causes the wireless transmission and reception unit 16 to perform retransmission.

On the other hand, if the HS-PDSCH reception result is detected by the uplink signal processing unit 20 to be an ACK signal, retransmission control is not necessary, so in order to transmit the next new transport block, the control unit 18 reads unread (not-transmitted) (queued for transmission) MAC-d PDUs stored in the storage unit 17, generates a new MAC-hs PDU, and provides it to the downlink signal generating unit 19 to perform control that causes the wireless transmission and reception unit 16 to transmit.

The foregoing is the H-ARQ (retransmission control) related operation of the wireless base station, but as described above, under HSDPA, CQI information is received periodically by the wireless base station 6 from the mobile station 7 in order perform adaptive modulation control.

CQI information is received by the uplink signal processing unit 20, so the uplink signal processing unit 20 provides this CQI information to the adaptive modulation management unit 22.

CQI information corresponds to the reception quality (e.g. reception SIR) of a downlink signal (e.g. CPICH) transmitted from the wireless base station 6 and received by the mobile station 7.

For example, 30 types of CQI information 1 through 30 are prepared, the mobile station 7 selects and transmits CQI information corresponding to the reception quality, and the adaptive modulation management unit 22 designates the transmission format corresponding to the CQI information received from the mobile station 7 to the wireless transmission and reception unit 16 and downlink signal generating unit 19 to cause adaptive modulation control to be performed according to that format.

Examples of transmission format include the TBS (Transport Block Size) bit number, which indicates the number of bits transmitted in one sub-frame; the code number, which indicates the number of spreading codes used for transmission; and modulation type, which indicates the modulations scheme, such as QPSK or QAM.

Thus, by making the CQI bigger when the SIR of CPICH is better (when the SIR is greater), and defining the corresponding TBS bit number and spreading code number to be greater the greater the CQI, causes the transport speed to be controlled such that it becomes faster when the downlink reception quality is better (conversely, the worse the reception quality, the slower the transport speed is controlled to be).

Since the mobile station 7 also needs to be notified about these transmission formats, the adaptive modulation management unit 22 provides transmission format information to the downlink signal generating unit 19 as data for HS-SCCH which is transmitted as an alert before the transmission of HS-PDSCH, which is transmitted using adaptive modulation control, as described above, and the transmission format information is transmitted to the mobile station 7 via the wireless transmission and reception unit 16.

The foregoing was the basic configuration and operation of the wireless base station 6, but as discussed above, there are also cases where a single wireless base station 6 forms a plurality of wireless areas (cells).

Figure 6:
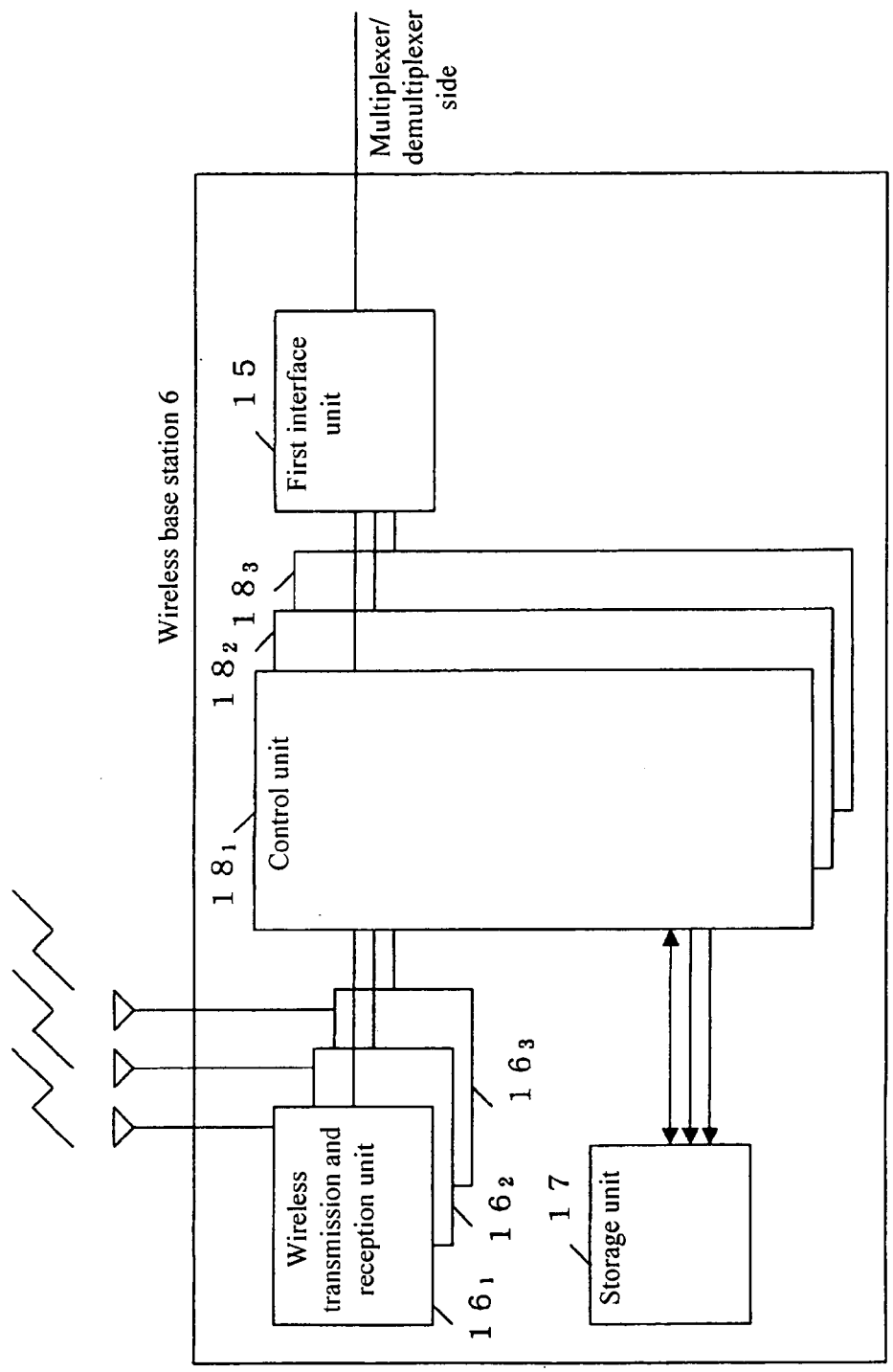
FIG. 6 is a diagram which illustrates a wireless base station (example 2 according to the present invention).

FIG. 6 is a diagram illustrating the configuration in the case where a singe wireless base station forms a plurality of wireless areas.

The various components are basically the same as in FIG. 5, but multiple (in this case, three) wireless transmission and reception units 16 and control units 18 are provided, one for each wireless area (cell); and data received via the first interface unit 15 is mapped to the corresponding control units $18_1$ through $18_3$; and each of the control units $18_1$ through $18_3$ execute processing (adaptive modulation control, retransmission control, etc.) equivalent to that of the control unit 18 described above for the wireless area that it serves.

It is also possible to use a shared storage unit 17 for all the control units.

Mobile Station 7

Next, the configuration and operation of the mobile station will be described.

Figure 7:
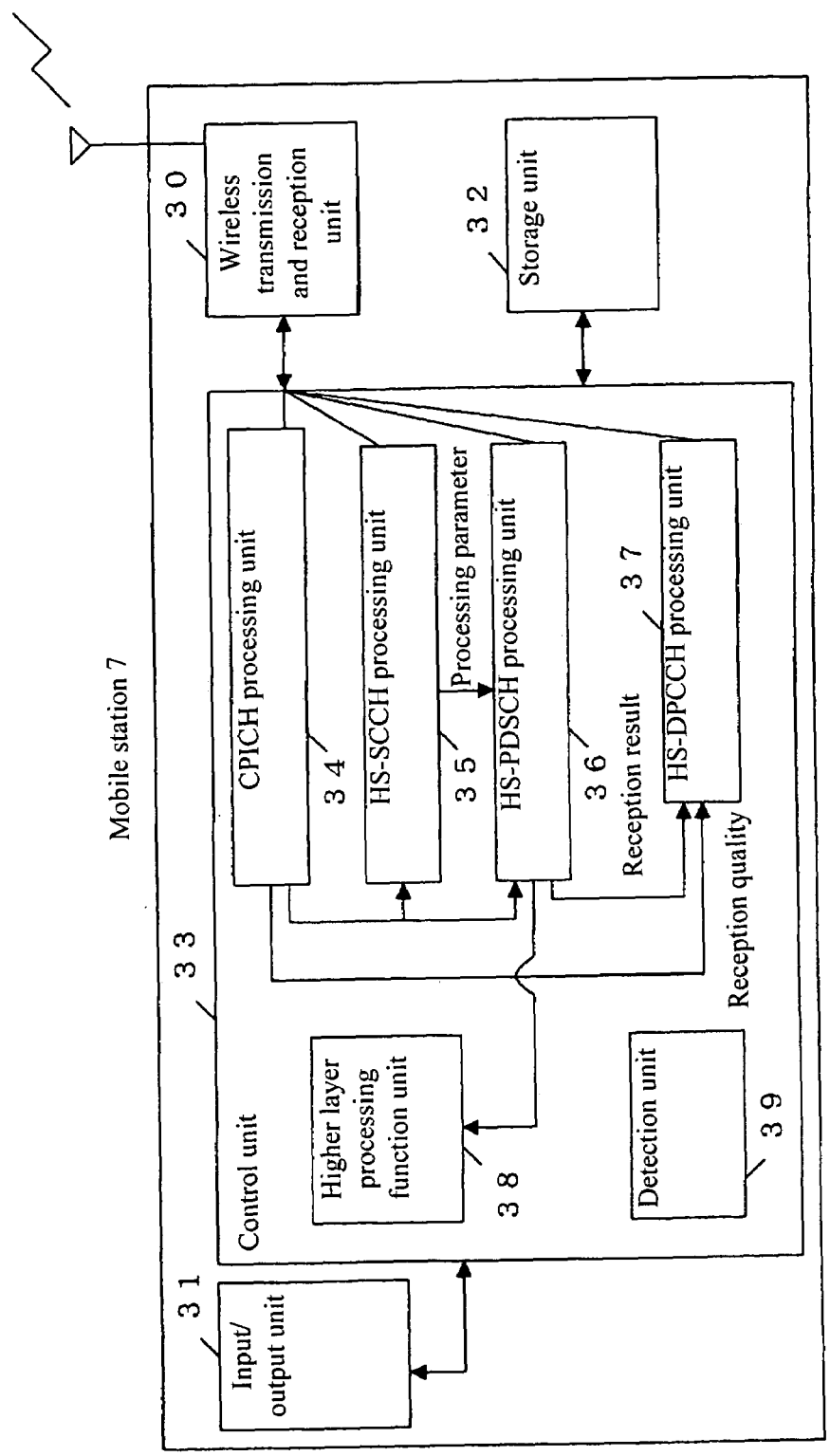
FIG. 7 is a diagram which illustrates a mobile station according to the present invention.

FIG. 7 shows the configuration of mobile station 7. In the FIG. 30 represents a wireless transmission and reception unit for performing wireless communication with the wireless transmission and reception unit 16 of the wireless base station 6, and 31 presents an input/output unit which performs input of voice, data, and the like, and output of received voice and data.

32 represents a storage unit which stores various necessary data, and is used for temporarily storing data which caused a reception error in order to implement H-ARQ.

33 represents a control unit which performs control of the various units and comprises a CPICH processing unit 34, HS-SCCH processing unit 35, HS-PDSCH processing unit 36, HS-DPCCH processing unit 37, higher layer processing function unit 38, and detection unit 39.

The CPICH processing unit 34 performs reception processing of CPICH, which is transmitted continually from the wireless base station 6, in determination sectors or the like, and provides the reception quality (reception SIR) determination result to the HS-DPCCH processing unit 37. Furthermore, the IQ plane phase information for the pilot signal obtained by reception processing of CPICH is provided to the HS-SCCH processing unit 35, HS-PDSCH processing unit 36 and the like, enabling synchronization detection (channel compensation).

While receiving HSDPA service, the mobile station 7 periodically transmits CQI information as feedback to the base station via HS-DPCCH for purposes of adaptive modulation control. Here, the CQI information transmitted is for example CQI information corresponding to the result determined in the period from three slots until one slot before CQI transmission.

The correspondences between reception quality (reception SIR) and CQI information are stored in the storage unit 32, making it possible to select the CQI information to be transmitted by selecting the CQI information corresponding to the reception quality.

The HS-SCCH processing unit 35 performs reception processing for each sub-frame of HS-SCCH, which is transmitted from the wireless base station 6, checking if there is a transmission alert that data is to be transmitted to the station in question via HS-PDSCH.

Namely, the HS-SCCH processing unit 35 receives the first part of HS-SCCH, multiplies it by the station-specific code allocated to the mobile station and then decodes it, and detects if the transmission was addressed to the station in question based on the decoding result (e.g. likelihood information).

Here, if it is detected that there was a transmission addressed to the station in question, reception processing of the remaining second part is completed, and reception error detection is performed based on the error detection bits for the first and second parts as a whole. If the HS-SCCH processing unit 35 detects an error, the detection of the alert can be considered to have been erroneous, and the following processing in the HS-PDSCH processing unit 36 can be discontinued.

Having detected the presence of a transmission alert addressed to the station in question, the HS-SCCH processing unit 35 notifies the HS-PDSCH processing unit 36 to receive the HS-PDSCH sub-frame two slots ahead.

At the same time, notification of the code information and modulation type information provided in part 1 of HS-SCCH from the wireless base station 6 is also given.

As a result, the HS-PDSCH processing unit 36 can begin reception processing of HS-PDSCH, and thereafter acquires other information required for reception processing which is contained in the remaining second part to complete HS-PDSCH reception processing (de-rate matching, error correction decoding, etc.) from the HS-SCCH processing unit 35 and performs error detection on the decoding result.

The HS-PDSCH processing unit 36 then notifies the HS-DPCCH processing unit 37 regarding the presence or absence of CRC error in the decoding result for HS-PDSCH. It furthermore performs reordering based on the TSN contained in the MAC-hs PDU obtained by decoding, and passes on the data after reordering to the higher layer processing function unit 38.

The higher layer processing function unit 38 determines if there is a missing sequence number in the sequence numbers contained in the MAC-d PDUs, notifies the wireless base station controller 2 (3) via a separately provided dedicated channel regarding the detection of a missing sequence number, and executes retransmission control in the RLC layer. Received data acquired in the sequence number order is successively output from the input/output unit 31 in the corresponding output format (voice output, image output, etc.).

The HS-DPCCH processing unit 37 selects the parameter (the CQI parameter used for adaptive modulation control in the wireless base station 6) corresponding to the reception quality given by the CPICH processing unit 34 based on the correspondences (CQI table) stored in the storage unit 32, and transmits it to the wireless base station 6 via HS-DPCCH. Furthermore, the HS-DPCCH processing unit 37 transmits a reception result signal (ACK signal or NACK signal) via HS-DPCCH according to the notification of presence or absence of error from the HS-PDSCH processing unit 36.

In other words, the HS-DPCCH processing unit 37 provides and causes the wireless transmission and reception unit 30 to transmit an ACK signal if there is no error or a NACK signal if there is an error.

The detection unit 39 detects that handover is being carried out. The fact that handover is being carried out can be detected for instance by being notified by the wireless base station controller 2 (3) of the fact that handover should be initiated via wireless base station 6, and of the initiation timing (e.g. timing A of FIG. 2).

Therefore, each HS-SCCH sub-frame is checked by the mobile station 7, and upon being notified that data will be transmitted to the station in question via HS-PDSCH, the mobile station receives the HS-PDSCH sub-frame two slots ahead, demodulates and decodes (turbo decodes) it to obtain a decoding result, determines if reception was successfully based on CRC computation using the CRC bits, and if reception was not successful, the received data is stored in the storage unit 32, and a NACK signal is transmitted to the wireless base station 6 via HS-DPCCH.

When retransmission is executed by the wireless base station 6, decoding (turbo decoding) is performed after combining the data stored in the storage unit 32 with the retransmitted data, and a CRC check is conducted again on the decoded data.

If the CRC error indicates success, the HS-DPCCH processing unit 37 performs control to cause an ACK signal to be transmitted to the wireless base station 6 via HS-DPCCH.

Reordering is then performed based on the TSNs contained in the MAC-hs PDU obtained by decoding, and the MAC-d PDUs (RLC PDUs) contained in the reordered transport block are passed on to the higher layer processing function unit 38.

The higher layer processing function unit 38 performs reordering using the sequence numbers contained in the RLC PDUs, and carries out detection of missing sequence numbers and checking of the polling bits.

Here, if a missing sequence number is detected, the RLC processing function unit of the mobile station 17 transmits the sequence number of the PDU that could not be received properly via a separately established dedicated physical channel (DPCH) to the wireless base station controller 2 (3) for retransmission control in the RLC layer.

The ACK signal and the sequence number of the PDU that could not be correctly received are transmitted under control by the higher layer processing function unit 38 of the mobile station 7 via the wireless base station 6 and multiplexer/demultiplexer 4 (5) to the wireless base station controller 2 (3).

Upon receiving the sequence number of the PDU that could not be correctly received from the higher layer processing function unit 38, the control unit 11 of the wireless base station controller 2 (3) uses retransmission control processing to read the data (HS-PDSCH frame) to be retransmitted from an unillustrated storage unit and perform retransmission.

The foregoing was a description of the configuration and operation of the various devices. The operation during handover will be described in detail below.

Operation During Handover (A) HS-SCCH (HS-PDSCH) Transmission Scheduling

Figure 8:
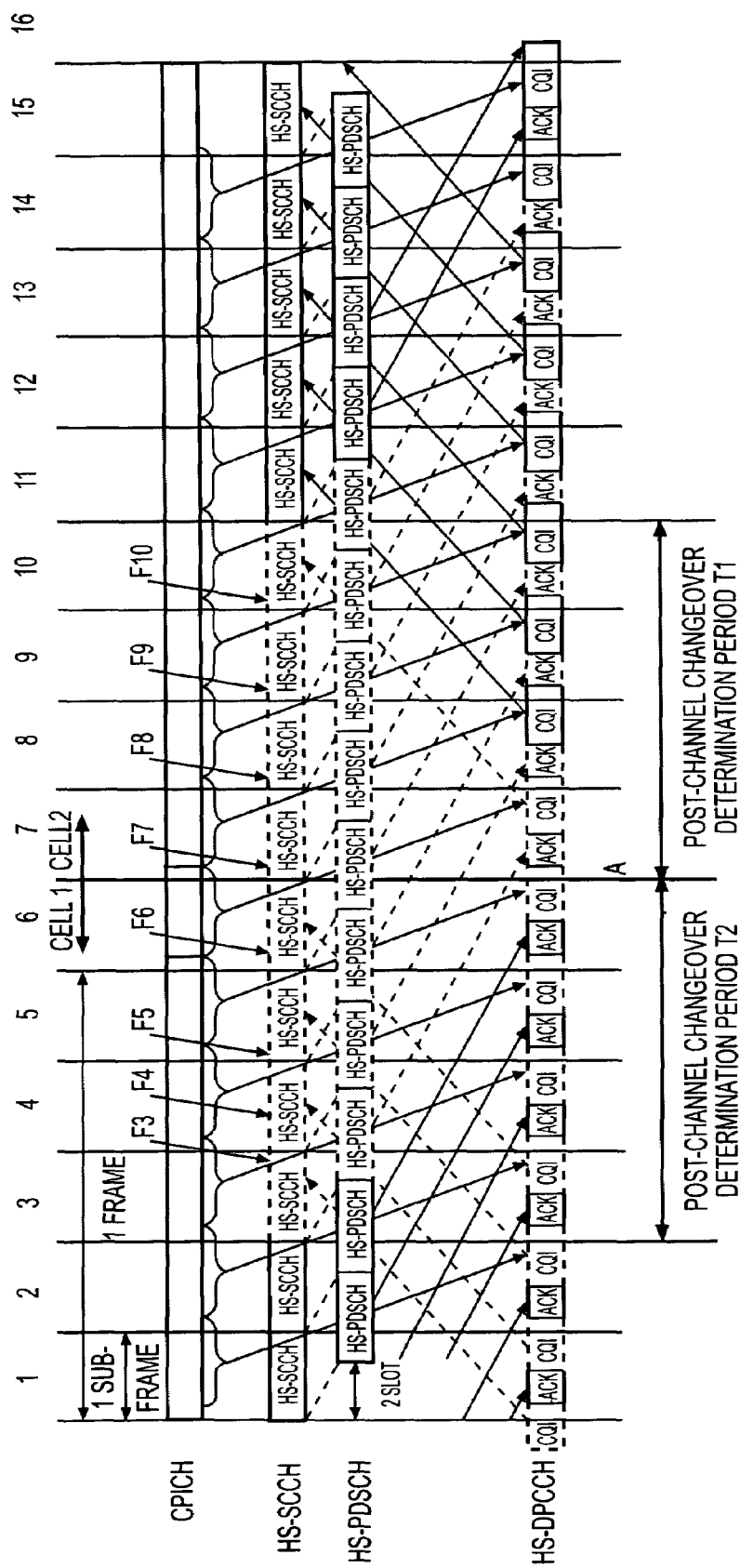
FIG. 8 is a diagram which illustrates HS-SCCH transmission scheduling during handover according to the present invention.

FIG. 8 illustrates both the uplink and downlink frame formats to explain the HS-SCCH (HS-PDSCH) transmission scheduling for a mobile station undergoing handover.

First, it is assumed that the mobile station 7 is currently located in a wireless zone (cell) of one of the wireless base stations 6 of FIG. 3, and is receiving HSDPA service. Here, it will be assumed that the mobile station 7 is currently location in the wireless zone of wireless base station $6_1$.

In this case, the mobile station 7 receives the first datum (e.g. three slots of CPICH) transmitted from the wireless base station $6_1$ at the CPICH processing unit 34 (see the solid black portion of CPICH in FIG. 8), and transmits a second datum (e.g. CQI information) generated based on the reception quality (e.g. reception SIR) of the received first datum by means of the HS-DPCCH processing unit 37 to the wireless base station $6_1$ (see the CQI information transmitted one slot after completion of reception of the solid black portion).

Figure 2:
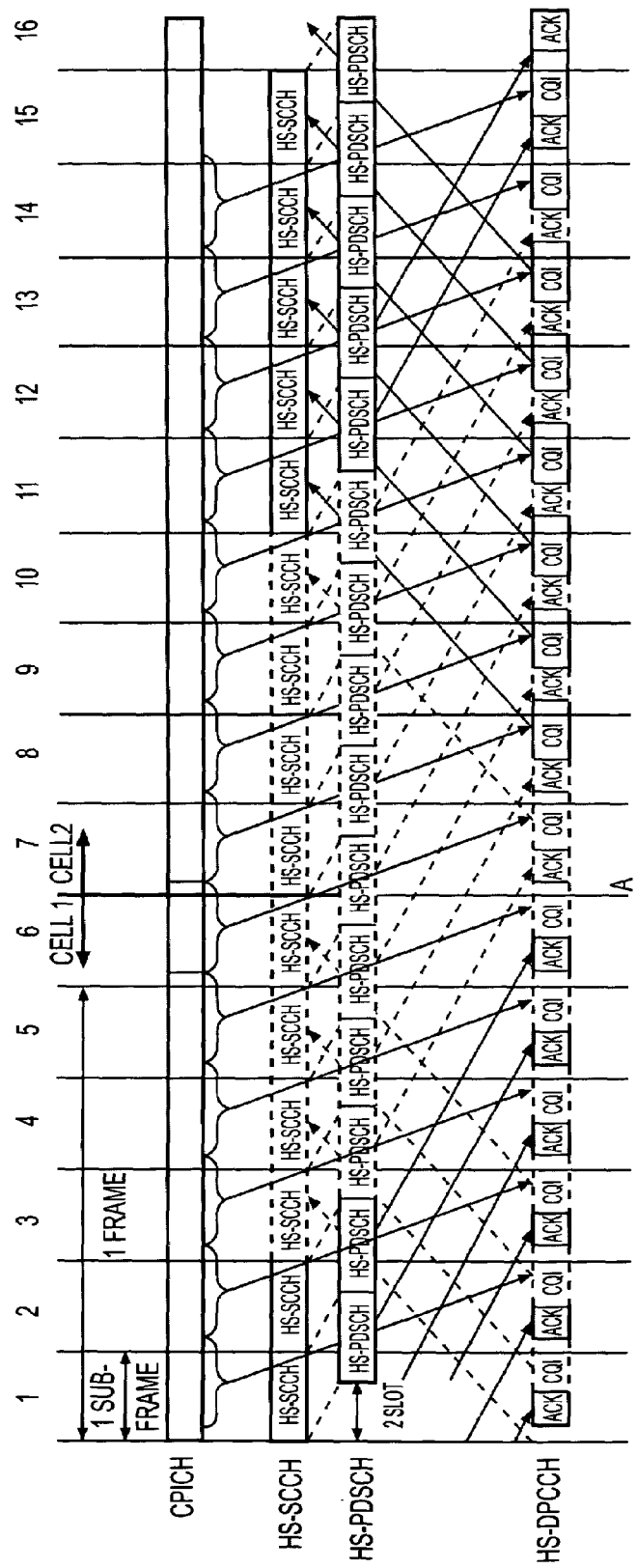
FIG. 2 is a diagram which illustrates the operation during handover.

In response to this second datum, the wireless base station $6_1$ transmits a third datum (see e.g. the fifth HS-SCCH sub-frame) and the corresponding HS-PDSCH sub-frame, and the mobile station 7 transmits an ACK signal (assuming no reception error) with a timing that puts it in the ninth sub-frame, thereby completing one cycle of data transport, but, as illustrated in FIG. 2, if a handover occurs midway (e.g. between the sixth sub-frame and the seventh sub-frame), a problematic data portion will occur, including data contained in this cycle (see the data surrounded by the dotted line frame in FIG. 2).

However, in this embodiment, a restriction on the mobile stations to which transmission alerts are to be transmitted to via HS-SCCH is imposed by the control unit 18 of the wireless base stations 6. Namely, when a mobile station undergoing handover is detected by the detection unit 23 of a wireless base station 6, the control unit 18 provides control such that transmission of data via HS-PDSCH to that mobile station becomes less likely compared to other mobile stations.

For example, as illustrated in FIG. 8, control may provided so that transmission of data via HS-PDSCH to a mobile station undergoing handover becomes less likely in a specific period T1 before the changeover timing A of the HS-SCCH channel, which is the transmission alert channel, due to handover, and/or the specific period T2 after timing A.

Possible techniques for such control include for example eliminating a mobile station undergoing handover from the transmission destination candidates during these periods T1 and T2, reducing its priority in cases where transmission destination mobile stations are selected in order based on priority, and the like.

Such control can be performed once during a period, or continuously throughout the period.

In this way, control is provided such that data tends not to be transmitted via a shared channel to mobile stations where problematic data is likely to arise due to handover.

Furthermore, since this makes it possible to instead transmit data via the shared channel to other mobile stations, the shared channel utilization efficiency is improved.

Moreover, in cases where retransmission control is performed, the incidence of retransmission control is reduced.

The foregoing was an example of the control performed on mobile stations 7 undergoing handover. The following types of control can also be used.

Other Example 1

In this example, the control unit 18 provides control so as to make it difficult to perform transmission alerts (data transmission) to mobile stations undergoing handover for sub-frames F3 through F6, which are HS-SCCH sub-frames transmitted before the alert channel (HS-SCCH) changeover timing A, with the transmission timing of the reception result (ACK signal or NACK signal) for the data whereof transmission is alerted via HS-SCCH being after the changeover timing A (see the third through sixth HS-SCCH sub-frames in FIG. 8).

This makes it possible to prevent useless transmission of data to mobile stations for which the risk of not being able to reliably acquire the reception result is high due to channel changeover.

Other Example 2

In this example, the control unit 18 provides control so as to make it difficult to perform transmission alerts (data transmission) to mobile stations undergoing handover for sub-frames F7 through F10, which are HS-SCCH sub-frames transmitted after the alert channel (HS-SCCH) changeover timing A, with the transmission of the parameters (e.g. CQI information) needed to perform the transmission alert via HS-SCCH being timed before the changeover timing A (see the seventh through tenth HS-SCCH sub-frames in FIG. 8).

This makes it possible to prevent useless transmission of data to mobile stations for which the risk of not being able to reliably acquire the parameters need for transmission alert is high due to channel changeover.

Other Example 3

In this example, the control unit 18 provides control so as to make it difficult to perform transmission alerts (data transmission) to mobile stations undergoing handover for sub-frame F6, which is an HS-SCCH sub-frame transmitted before the alert channel (HS-SCCH) changeover timing A, with the transmission of the data (HS-PDSCH) whereof transmission is alerted by this sub-frame verging on the changeover timing A (see the sixth HS-SCCH sub-frame in FIG. 8).

This makes it possible to prevent useless transmission of data to mobile stations for which the risk of not being able to reliably receive the data is high due to channel changeover.

(b) Description of Second Embodiment

In this embodiment, transmission of reception quality information before channel changeover is avoided as much as possible for mobile stations undergoing handover.

Operation during handover (transmission of quality information)

Figure 9:
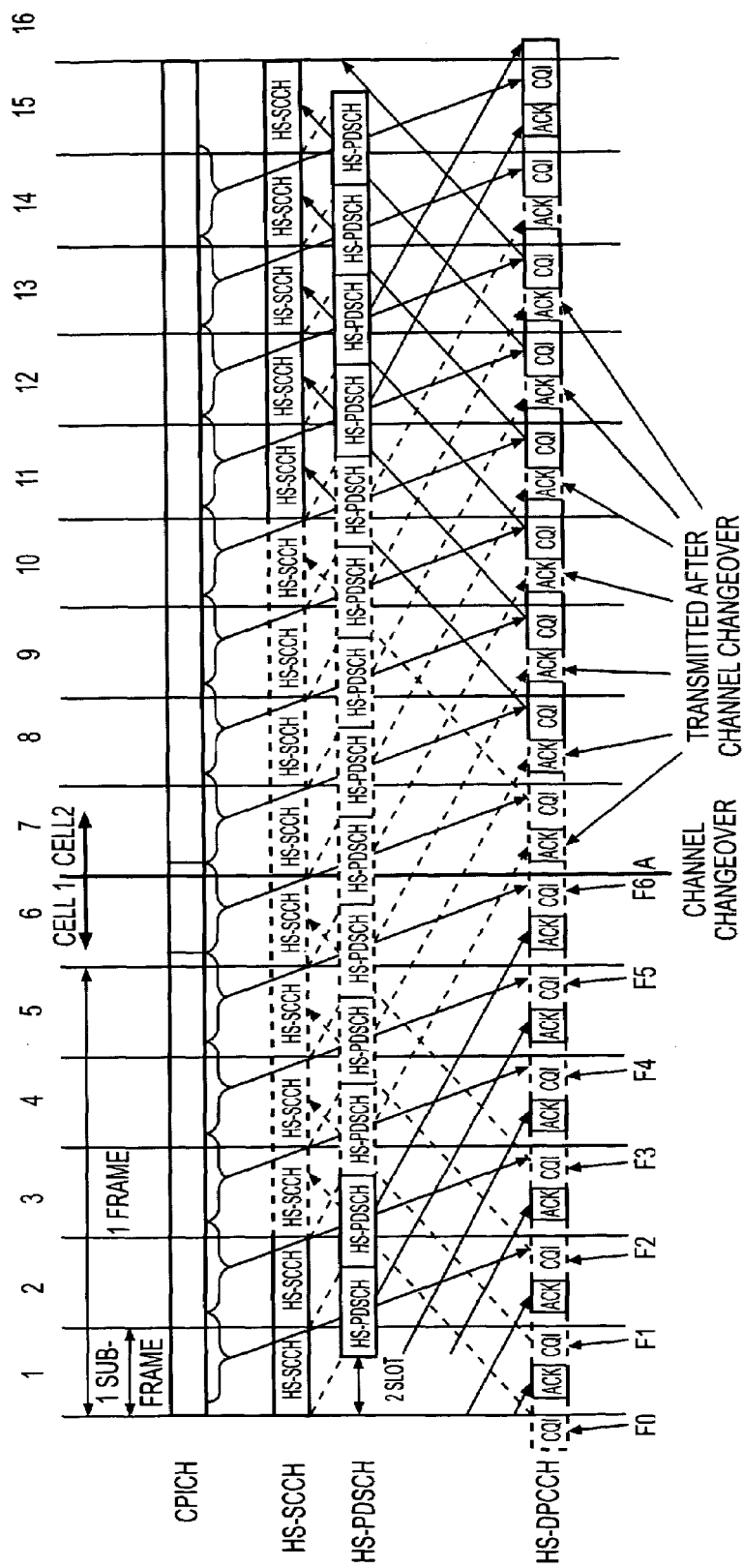
FIG. 9 is a diagram which illustrates the transmission of CQI during handover according to the present invention.

FIG. 9 illustrates both the uplink and downlink frame formats to explain the transmission of HS-DPCCH (especially the CQI information which serves as quality information) by a mobile station undergoing handover. The assumptions are the same as in FIG. 8.

In this embodiment, the control unit 33 of the mobile station 7 imposed restrictions on the reception quality information (e.g. CQI information) transmitted to the wireless base stations 6 during handover.

When the detection unit 39 of the mobile station 7 detects that handover is being performed, based on notification from the wireless base station controller 2 or the like, the control unit 33 provides control to impede transmission of CQI information.

For example, as illustrated in FIG. 9, the control unit 33 may provide control such that CQI information is not transmitted for F0 through F6 (see CQI information in sub-frames zero through six), for which the transmission timing is before the channel changeover timing A of the transmission alert channel HS-SCCH due to handover, but the transmission timing of the HS-SCCH (HS-PDSCH) sub-frames transmitted from the wireless base station 6 based on the CQI information transmitted with said transmission timing is after timing A.

Here, assuming that all of F0 through F6 are not to be transmitted, providing control such that transmission is not performed includes not transmitting at least one of them.

Since CQI information which is not going to be transmitted does not need to be generated, preferably, in the corresponding determination segment, reception of CPICH for specification of CQI information, or determination of reception quality, or the operation of selecting CQI information corresponding to the reception quality determination result based on data stored in the storage unit 32 would not be performed.

This would make it possible to further reduce power consumption.

(c) Description of Third Embodiment

In this embodiment, transmission of reception result information after channel changeover is avoided as much as possible for mobile stations undergoing handover.

Operation during handover (transmission of reception result)

Figure 10:
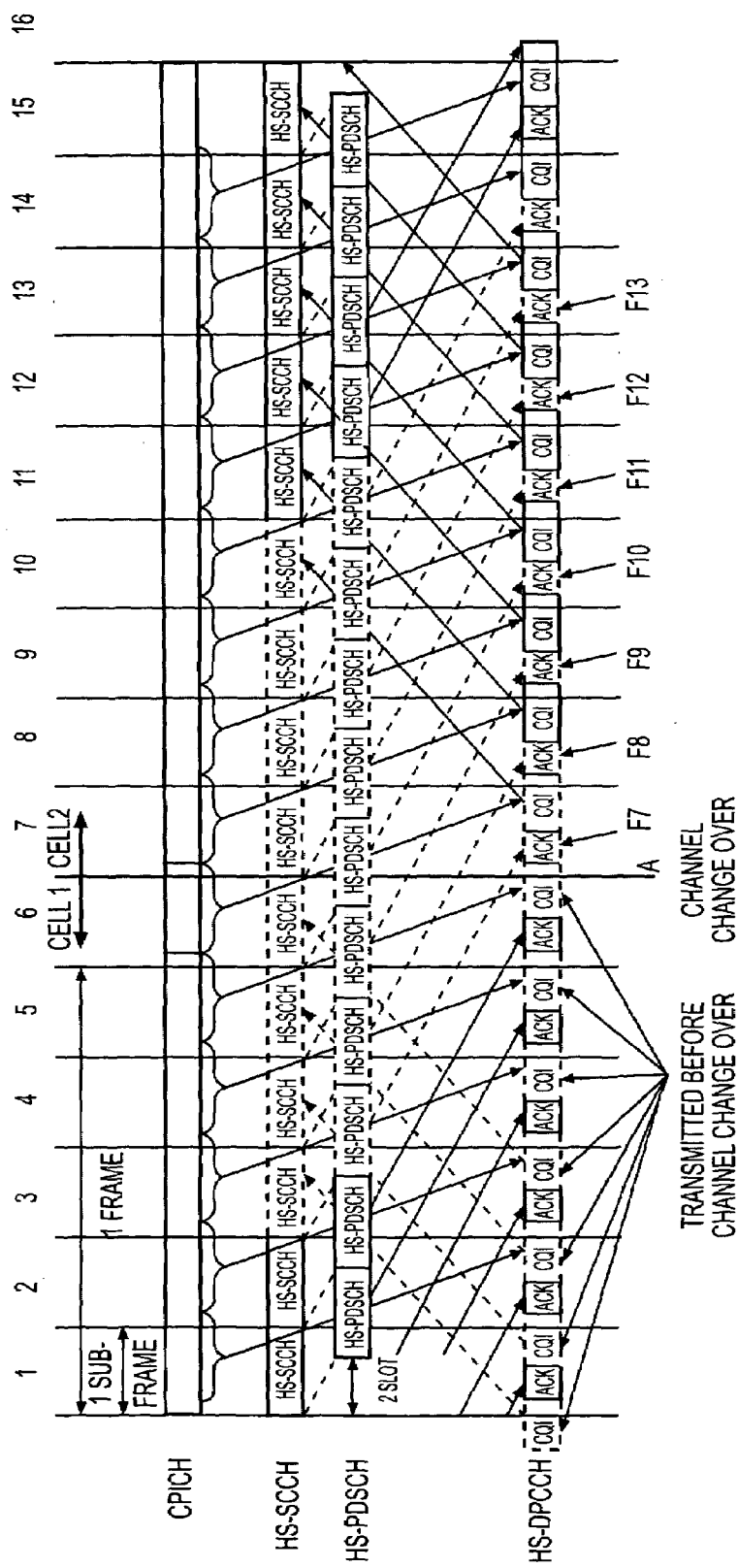
FIG. 10 is a diagram which illustrates the transmission of ACK signals (NACK signals during handover according to the present invention.

FIG. 10 illustrates both the uplink and downlink frame formats to explain the transmission of HS-DPCCH (especially the ACK signals or NACK signals which serve as the reception result) by a mobile station undergoing handover. The assumptions are the same as in FIG. 8.

In this embodiment, the control unit 33 of the mobile station 7 imposed restrictions on the reception result information (e.g. ACK signals and NACK signals) transmitted to the wireless base stations 6 during handover.

Namely, when the detection unit 39 of the mobile station 7 detects that handover is being performed, based on notification from the wireless base station controller 2 or the like, the control unit 33 provides control to impede transmission of reception result information.

For example, as illustrated in FIG. 10, the control unit 33 may provide control such that reception result information such as ACK (NACK) is not transmitted for F7 through F13 (see the ACK signal in sub-frames 7 through 13), for which the transmission timing is after the channel changeover timing A of the transmission alert channel HS-SCCH due to handover, but where the transmission of parameters (CQI information) used in transmitting the HS-SCCH (or HS-PDSCH) sub-frames relating to the reception result indicated by the reception result information transmitted with said timing occurs before timing A.

Here, assuming that all of F7 through F13 are not to be transmitted, providing control such that transmission is not performed includes not transmitting at least one of them.

Since ACK signals (NACK signals) which are not going to be transmitted do not need to be generated, preferably, the operations of receiving the corresponding HS-SCCH and HS-PDSCH, transmitting the corresponding CQI, and determining the reception quality of the corresponding CPICH would not be performed.

This would make it possible to further reduce power consumption.

The control unit 33 can also provide control so as not to transmit the CQI information to be transmitted next after F6 in FIG. 9 or the ACK (NACK) signal to be transmitted next after F13 in FIG. 10.

This is because the wireless zone for which reception quality is to be determined (cell 1) and the wireless zone to which the reception quality is transmitted (cell 2) may be different, and because the wireless zone in which the alert channel (HS-SCCH) is transmitted (cell 1) and the wireless zone in which the reception result (ACK signal, etc.) is transmitted (cell 2) may be different.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A wireless base station in a wireless communication system wherein mobile stations to be transmitted to are selected in order from a plurality of transmission destination candidate mobile stations and data transmission to the selected mobile stations is performed via a shared channel, the wireless base station comprising:
    a detection unit which detects whether each mobile station among the plurality of transmission destination candidate mobile stations is undergoing handover between shared channels; and
    a control unit which controls the selection based on the detection wherein mobile stations which are not detected by the detection unit as undergoing handover are given a higher likelihood to be selected in the selection than the mobile station which is detected by the detection unit as undergoing handover.

2. A wireless base station as set forth in claim 1, wherein the control is performed in a specific period before or after changeover, due to handover processing, of a channel which alerts that data is to be transmitted via the shared channel.

3. A wireless base station as set forth in claim 1, wherein the control relates to an alert channel which is transmitted before changeover of the alert channel which alerts that data is to be transmitted via the shared channel due to handover processing, where the transmission timing of the reception result for the shared channel transmitted according to the alert channel is after the changeover of the alert channel.

4. A wireless base station as set forth in claim 1, wherein the control relates to an alert channel which is transmitted after changeover of the channel which alerts that data is to be transmitted via a shared channel due to handover processing, where parameters to be used for the alert are transmitted before the changeover of the alert channel.

5. A wireless base station as set forth in claim 1, wherein the control relates to an alert channel which is transmitted before changeover of the alert channel which alerts that data is to be transmitted via the shared channel due to handover processing, where the shared channel transmitted according to the alert verges upon the timing of the changeover of the alert channel.

6. A mobile station which transmits reception quality information for signals received from a wireless base station and receives data which is transmitted via a downlink channel by the wireless base station based on the reception quality information, the mobile station comprising:
    a detection unit which detects that handover processing is being performed between shared channels; and
    a control unit which, upon the detection of the handover processing, controls reception quality information not to be transmitted when transmission timing of the reception quality information is before changeover of the downlink channel due to the handover processing, but transmission timing of data transmitted via the downlink channel from the wireless base station based on the reception quality information is after the changeover of the downlink channel.

7. A mobile station which transmits reception quality information for signals received from a wireless base station, receives transmission alerts and corresponding data which are transmitted via a downlink channel by the wireless base station based on the reception quality information, and transmits the reception result for the data to the wireless base station, the mobile station comprising:
    a detection unit which detects that handover processing is being performed between shared channels; and
    a control unit which, upon the detection of the handover processing, controls a reception result not to be transmitted when transmission timing of the reception result is after changeover of the downlink channel due to the handover processing, but transmission timing of reception quality information used for transmitting data relating to the reception result indicated by the reception result is before the changeover of the downlink channel.

8. A wireless base station in a wireless communication system wherein mobile stations to be transmitted to are selected in order from a plurality of transmission destination candidate mobile stations and data transmission to the selected mobile stations is performed via a shared channel, the wireless base station comprising:
    a detection unit which detects a mobile station undergoing handover; and
    a control unit which controls the selection based on the detection wherein mobile stations which are not detected by the detection unit as undergoing handover are given a higher likelihood to be selected in the selection than the mobile station undergoing handover with keeping the mobile station undergoing handover as one of the plurality of transmission destination candidate mobile stations.

9. A wireless base station in a wireless communication system wherein mobile stations to be transmitted to are selected in order from a plurality of transmission destination candidate mobile stations and data transmission to the selected mobile stations is performed via a shared channel, the wireless base station comprising:
    a detection unit which detects a mobile station undergoing handover; and
    a control unit which controls the selection based on the detection wherein mobile stations which are not detected by the detection unit as undergoing handover are given a higher likelihood to be selected in the selection than the mobile station undergoing handover before the handover is performed.

10. A method of operation of a wireless base station in a wireless communication system comprising the steps of:
    selecting mobile stations to be transmitted to in order from a plurality of transmission destination candidate mobile stations wherein data transmission to the selected mobile stations is performed via a shared channel;
    detecting a mobile station undergoing handover between shared channels; and
    controlling the selection based on the detection wherein mobile stations which are not detected as undergoing handover are given a higher likelihood to be selected in the selection than the mobile station which is detected.

11. A method of operation of a mobile station which transmits reception quality information for signals received from a wireless base station and receives data which is transmitted via a downlink channel by the wireless base station based on the reception quality information, the method comprising the steps of:
    detecting that handover processing is being performed between shared channels; and
    upon the detection, controlling reception quality information not to be transmitted when transmission timing of the reception quality information is before changeover of the downlink channel due to the handover processing, but transmission timing of data transmitted via the downlink channel from the wireless base station based on the reception quality information is after the changeover of the downlink channel.

12. A method of operating wireless base station in a wireless communication system comprising the steps of:
selecting mobile stations to be transmitted to in order from a plurality of transmission destination candidate mobile stations and data transmission to the selected mobile stations is performed via a shared channel;
detecting a mobile station undergoing handover; and
controlling the selection based on the detection wherein mobile stations which are not detected by the detection unit as undergoing handover are given a higher likelihood to be selected in the selection than the mobile station undergoing handover with keeping the mobile station undergoing handover as one of the plurality of transmission destination candidate mobile stations.

13. A method of operating wireless base station in a wireless communication system comprising the steps of:
selecting mobile stations to be transmitted to in order from a plurality of transmission destination candidate mobile stations and data transmission to the selected mobile stations is performed via a shared channel;
detecting a mobile station undergoing handover; and
controlling the selection based on the detection wherein mobile stations which are not detected by the detection unit as undergoing handover are given a higher likelihood to be selected in the selection than the mobile station undergoing handover before the handover is performed.

* * * * *